UNITED STATES PATENT OFFICE.

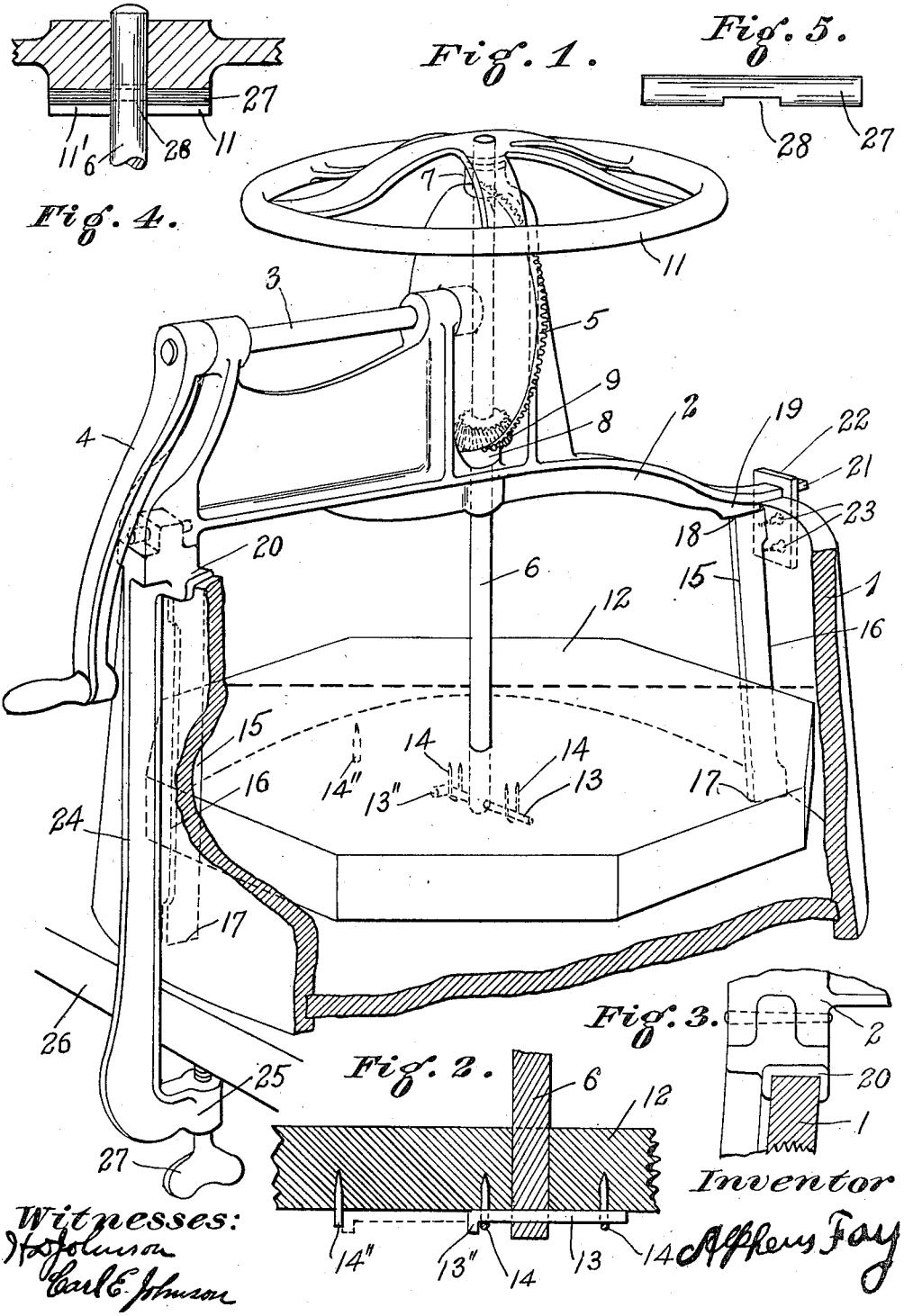

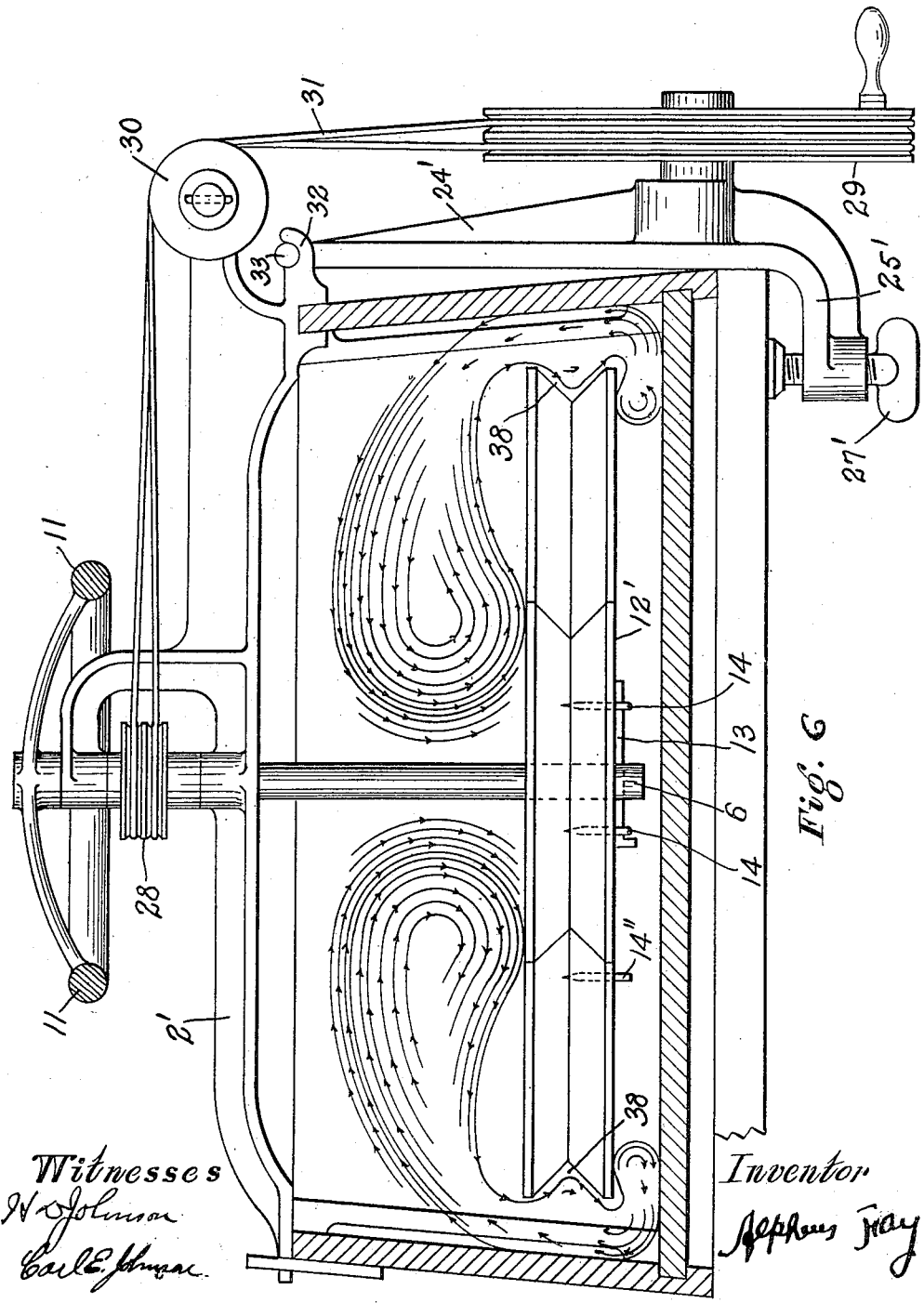

ALPHEUS FAY, OF LOUISVILLE, KENTUCKY.

APPARATUS FOR OPERATING UPON COMPOSITE SUBSTANCES.

1,210,779.  Specification of Letters Patent.  Patented Jan. 2, 1917.

Application filed March 1, 1915. Serial No. 11,352.

*To all whom it may concern:*

Be it known that I, ALPHEUS FAY, a citizen of the United States, and a resident of Louisville, in the county of Jefferson and State of Kentucky, have invented a certain new and useful Apparatus for Operating Upon Composite Substances, of which the following is a specification.

My invention relates to a novel apparatus operating centrifugally upon a substance, and the object is to provide means for operating upon substances such as milk elements in such a manner that the proportion of vertical pressure and of the impact within the body of liquid and the consequent disruptive agitation are minimized and the proportion of aeration centrifugal and centripetal action therein are maximized by virtue of operating in a body of substance with its depth minimized and its diameter maximized, equally distributing all of the forces to operate uniformly throughout the body of substance at a greater altitude of development.
A further object is to provide a device of this character of simplified and inexpensive construction, so arranged that the milk elements will be treated with facility, reducing the time and labor of operation as well as making it more convenient to place the apparatus in condition for operation and to take it apart after the operation is complete and keep it clean and sanitary.

My invention consists in the apparatus and the combination of parts thereof and in the details of construction and arrangement of such parts as will hereinafter be more fully described and claimed.

In the drawings, Figure 1 is a sectional perspective view of an apparatus embodying my invention; Fig. 2 is a detail sectional view of the lower end of the solid shaft and its means for securing it to the impeller. Fig. 3 is a detail of the bracket mounting.
Fig. 4 is a detail of part of the fly wheel with the upper end of the solid shaft and the means for attaching the fly wheel to said shaft. Fig. 5 is a detail of the pin that connects the fly wheel to the shaft. Fig. 6 is a sectional elevation of a modified apparatus showing how the impeller is driven by means of a belt and also showing a detachable means for attaching the apparatus to a suitable supporting means as well as attaching the bracket to the vessel.

The vessel 1 containing the milk elements to be operated upon, is of wide and low formation providing an ample base so that the vessel is readily secured in a permanent manner to a table or other supporting means; it also prevents the substance to be operated upon becoming deep in proportion to its diameter. Keeping the depth of a substance shallow in proportion to its diameter is a very important feature in the satisfactory operation of my apparatus, and for this reason I make my vessel for containing the substance to be operated upon of a wide and low formation, namely the diameter being greater than its depth. This is according to the method disclosed and claimed in my copending applications, Serial No. 744,158, filed January 25, 1913, Serial No. 829,982, filed April 6, 1914, and Serial No. 11,355, filed March 1, 1915.

The bracket 2 is mounted across the top of the vessel and secured to the rim thereof as will be more particularly described hereinafter.

A shaft 3 is journaled horizontally in the bracket and has a crank 4 fixed on it outside the bracket. A bevel gear 5 is fixed on this shaft inside the bracket and a vertical shaft 6 is journaled in the bracket 2 in upper and lower bearings 7 and 8 with a bevel pinion 9 fixed on it and in mesh with the bevel gear 5.

On the upper side of the upper bearing 7 of the shaft 6 is a fly wheel 11 fixed on said shaft 6.

The shaft 6 extends down into the vessel 1 and receives the impeller in the form of a polygonal block 12, which as here shown has eight flat sides, and is of diameter very much greater than its thickness. It is secured to the lower part of the shaft 6 by passage of the shaft 6 through a central opening in it and the passage of the pin 13 transversely through the shaft under the bottom of the block; this pin passing through stirrups or steeples 14 driven up into the block at opposite sides of the opening and the shaft that extends therethrough. One end of the pin has a head 13″ and a suitable stop 14″ is driven up into the block far enough away from the shaft 6 to allow the pin 13 to be completely withdrawn from the shaft and yet be kept from entirely leaving the steeple 14 on that side of the shaft. To properly coöperate with this agitator, brakes 15 are mounted in upright position against the opposite walls of the vessel 1; and these brakes are preferably of wood and preferably have their sides 16 next to the walls of the vessel separated from the walls a short distance by cutting away the material of the brake from near the upper end to near the lower end of the brake, the material left near the ends bearing directly against the vessel walls. The space thus left allows circulation of the liquid between the brake and the wall. The lower end 17 of the brake bears tightly on the bottom of the vessel, and the upper end 18 fits in a suitable socket 19 in the lower side of the bracket 2 near where the brake bears on the frame of the vessel at each end.

The bracket 2 has, at the end where the crank 4 is, a transverse part 20 with its lower side of channeled formation to fit snugly on the rim of the vessel and support the bracket at that end, while the other end 21 of the bracket is simply in the form of a flat shank which slips under the cleat 22 secured to the upper side of the rim of the vessel, preferably by screws 23 as shown. Joining the bracket 2 outside the channeled part 20 and preferably integral with the bracket is an arm 24 that extends down along the outside of the vessel when the bracket is placed on the vessel, this arm 24 having a terminal part 25 adapted to come sufficiently far below the bottom of the vessel to pass under the table or other object 26 upon which the vessel is to be supported, and this terminal part 25 has a clamp screw 27 passing up through it to bear against the lower side of the top of the table or other object 26. With the shank end 21 of the bracket fitting snugly under the cleat 22 and thus supporting and steadying this end of the bracket, and with the channeled part 20 fitting the rim of the vessel 1 snugly, it is thus possible to secure the bracket 2 firmly on the vessel 1, and at the same time secure the bracket firmly to the table or other object. This result is thus attained by means of a very simple construction of the combined bracket and clamp; and the work of securing it is reduced to merely slipping the shank end 21 under the cleat 22, bringing the part 20 down on the rim of the vessel and then sliding the vessel over on the table or other object until the terminal part 25 comes under the top of the table or other object, and then screwing the clamping screw tightly in position. This clamping means is disclosed and claimed in my copending application Serial No. 11,353, filed March 1, 1915.

The use of the polygonal block 12, depending for centrifugal action on the circulating liquid entirely upon the frictional contact of said liquid with the plane upper and lower surfaces of the block and upon the slight angular engagement of the flat sides of the block with the adjacent liquid, marks a distinct departure in the art of constructing and operating apparatus to act centrifugally upon liquids. Thus arranged, when the block is rotated the liquid in contact therewith is thrown horizontally along the plane upper and lower surface of the block outward in every direction, and is also thrown away from the diagonal sides of the members as shown in Fig. 6. The walls of the liquid around the periphery is kept in a V-shaped serpentine formation. The centrifugal action along the plane surfaces of the members will cause a reduction of pressure on the liquid in the central region around the shaft 6 with the result that atmospheric air under atmospheric pressure will pass outwardly into the liquid in such central regions until it reaches the upper surfaces of the members where it will be carried outward along with the liquid that is being thrown outward by this centrifugal action. The frictional centrifugal action of the lower surfaces of the block keeps the region between this block and the bottom of the vessel clear of the solid matter that collects as a result of the operation as for instance the collection of the butter particles in separating butter from the other milk elements. The liquid thrown out by the lower surfaces of the block mingles in the region around the periphery of the block with the liquid thrown out by the upper surface of the block and with the air carried along by said liquid. The tendency of these currents of liquid and air is upward adjacent to the walls of the vessel and the brakes 15 will prevent simply whirling of the liquid in the vessel and so modify the direction of the liquid and air currents that a continuous smooth inflow and steady roll of the rarefied liquid will occur around the vessel, as is best indicated in Fig. 6. Owing to the absence of impact by the impeller the nature of the liquid and air currents will be such that their contact with the brakes will not result in any violent agitation. On the contrary, the application of the forces to the liquid and air is so steady and smooth that an extremely uniform distribution of the forces and air throughout the body of the liquid is effected. This uniform aeration throughout the liquid is comparable to the uniform activity of a body of liquid undergoing a gentle boiling process caused by heat applied to the liquid. I have discovered that such a uniform distribution of the forces throughout a liquid produces true ebullition, without heat.

The result of operation according to my method is to produce the above described true ebullition; and as near as I have been able to determine, this true ebullition is the manifestation of a huge number of vibrations, the result of a huge number of distinct minute currents of infinitesimal elements of energy very uniformly distributed throughout the body of milk or other liquid. These vibrations separate the butter or fatty elements causing the non-fatty elements to divide and go into minute suspension or solution with the water of the milk or other liquids; or else to remain in such minute suspension or solution in the water as they were in the original milk or other liquid; and causing the fatty elements to form into visible or palpable bodies in the form of crystals or granules of about the size and shape of coarse grains of salt. On account of the exceedingly minute divisions of the distribution of the forces throughout the liquid body, and the uniformity of this distribution, these changes are harmoniously brought about in an exceedingly short space of time, as herein described. The wide difference between the nature of this operation and that of ordinary churning or separating operation, either without aeration or with inferior and practically negligible aeration, is indicated by the great difference in time required to bring about these changes as regards my invention compared to other methods herein alluded to, as well as by the marked increase in purity of the product and in proportion of fatty elements recovered, as will be more fully pointed out herein. Processes of separating butter from the other milk elements have always involved some kind of violent agitation; and, where aeration was resorted to, the means and methods employed were such that the aeration obtained was practically negligible owing to lack of uniform application. I minimize the agitation and the vertical pressure and maximize the aeration and centrifugal force so that the proper proportion of vertical pressure, aeration, agitation, centrifugal and centripetal force is obtained, with the result that true ebullition is obtained without the application of heat. Forcing air through a liquid by the action of a pump or blower has more the effect of mechanical agitation than it does of aeration, and cannot be described as true ebullition for this reason, and also for the reason that the distribution of all the forces throughout the liquid will not be uniform. With my method, involving centrifugal and centripetal action without impact, the entrance of the air into the liquid is caused by the atmospheric pressure, and the action is such that the air entering under this pressure is brought into contact with practically every particle of the liquid during the operation. This in conjunction with all the other forces acting uniformly on the liquid, produces true ebullition.

With the same volume of liquid placed in a deep vessel or a shallow vessel, and the diameter of the shallow vessel being such that the liquid will be about half the depth of that in the deep vessel the energy required to churn the cream is about one-fourth that in the shallow vessel to what would be required to do the same work in the deep vessel, and the result attained will be better, namely, better butter and more butter than can be made in the deep body of liquid. The butter which is made by revolving a disk in a shallow body of cream will not become rancid as soon as butter made in the ordinary way, because the small globules of butter fat have not been broken up and the other ingredients of the milk which cause butter to become rancid have been kept separated from the butter fat globules. The friction of the disks revolving in a liquid is directly proportioned to the area of rubbing surface; the energy required is proportional to the resistance overcome. According to my method the liquid depth must be such that the force applied will be uniformly distributed throughout the entire body of liquid. When a disk revolves in a liquid that has its depth several times greater than its diameter the liquid immediately in contact with the disk, and for a very limited distance from the disk, may be affected; but the main body of the liquid will not be acted upon. In a shallow body of liquid, which has a diameter greater in proportion to its depth, the vertical pressure on the disk is slight, and all the liquid in turn being in true contact with the disk, the forces applied are utilized in the most efficient manner possible. The peripheral speed of my disks is always the same, operating about eleven hundred and fifty feet per minute. I have found by revolving disks in cream of different depths that the same disk revolving in shallow cream will produce more butter, better butter, and make it in less time. In the shallow body of liquid, the energy applied through the disk to the liquid is equally distributed through the entire body; but in the deep body of liquid the forces are not equally distributed. Therefore the efficiency is less in the deep body of liquid and owing to the relation between the disk and the deep body of liquid it is impossible to ever attain the same efficiency in a deep body of liquid as in a shallow body by my process, and if the body of liquid is very deep in proportion to the diameter no perceptible effect would be had upon it. In two vessels containing the same quantity of liquid, one having its height twice that of the other, and the shallow one having its diameter increased so that half the height will cause it to contain the same amount of liquid as the tall vessel, when my disk is revolved in the shallow body of liquid, the energy required to operate the disk of greater diameter will be about one-fourth that required to operate the disk of lesser diameter; the peripheral speed of the disks being the same. To operate my device at the greatest efficiency, the depth of the liquid must have the right relation to the diameter. For example, a vessel of 7" diameter and 12" high, inside measurement, would contain about 2 gal., and a vessel 9⅝" diameter and 6" high, inside measurement, will contain about two gallons. Now, if I place one of my disks 6" in diameter in the vessel which is 12" high and submerge it in a liquid within the vessel 6" from the top and place one of my disks 8⅞" diameter in a liquid within the vessel which is 6" high 3" from the top, and both disks are revolved so that the peripheral speed of each disk is the same, the energy required to operate the large disk would be about one quarter that for operating the small disk, and the result obtained would be far superior. This action, although familiar as obtained by the action of heat on a liquid, could not be utilized in the treating of milk elements to obtain butter were it necessary to apply heat to the liquid sufficient to boil. It is unnecessary to rotate the agitator at a very high speed, and for this reason the fly wheel 11 is very desirable as it imparts the desired steadiness to the operation, and materially assists the operator in turning the crank 4. The manner in which the fly wheel 11 is attached to the vertical shaft 6 is shown in Fig. 4. The lower side of the hub of the fly wheel 11 has radial grooves 11' and the shaft 6 has an opening with a pin 27 passing transversely through it, which pin has on one side a recess 28. When the pin is passed through the opening within the grooves 26 of the fly wheel and the fly wheel bears downwardly upon the pin the recess 28 will pass down over the sides of the shaft adjacent to the opening therethrough so that the ends of the recess engaging with the sides of the shaft will prevent the pin from sliding laterally out of its position in the shaft while the engagement of the pin in the grooves of the fly wheel will cause the fly wheel to rotate with the shaft. Such a method of fastening the fly wheel to the shaft is superior to the use of a set screw because it does not interfere with the centering of the wheel on the shaft.

In the example shown in Fig. 6 the bevel pinion 9 is replaced by a pulley 28 having two distinct grooves on its periphery and the arm 24' detachably engages with the bracket 2' as will hereinafter be more fully described, this arm having mounted upon it a driving wheel 29, which also has two distinct grooves in its periphery. On the end of the bracket 2' near where the arm 24' engages with the bracket idler pulleys 30 are rotatably mounted each having two distinct grooves in its periphery, and an endless belt 31 passes around the driving wheel 29 and pulley 28 with two of its strands passing over each one of the idler pulleys 30. This arrangement secures the strength of two strands of the belt, while each strand may be comparatively thin and flexible, thus adapting the driving mechanism to run easily and smoothly, and also two strands of belt will have more area of frictional engagement with the respective pulleys than would a single strand of equal strength. This driving means is disclosed and claimed in my co-pending application Serial No. 24,787, filed April 29, 1915. The driving wheel 29 has its rotatable mounting adjustable up and down in an arm 24' to adjust it to the belt 31 and the pulleys 28 and 30. The detachable arm 24' is similar to the arm 24 of the example of Fig. 1 in extending under the table or other object that supports the apparatus with a clamping screw 27' through its part 25' that extends under the table. The upper end detachably engages with the bracket 2' by means of a fork 32 on the end of the bracket near where it rests on the rim of the vessel, the members of the fork having upwardly open recesses in which are received lateral projections 33 on the upper end of the arm 24 which upper end comes between the members of the fork 32, so that the arm and bracket interlock when the arm is drawn tight by means of the clamping screw 27'. When the arm 24' is loosened it may be swung outward pivoting on the parts of the fork 32 with its parts 33, so that the belt is released from the driving wheel. After the driving wheel has once been properly adjusted on the arm 24 the entire device may be assembled rapidly and when the belt 31 has been slipped over the wheel 29 and the pulleys and the arm 24' clamped in place the belt 31 will be properly stretched over the wheel and pulleys. After this it will not be necessary to adjust the driving wheel 29 excepting after some time when the belt may increase its length slightly from use.

Another modification, which is shown in Fig. 6, is grooving of the periphery of the impeller block 12'. This groove 38 is preferably of V-shape cross section. By this arrangement the contact area of the periphery if the impeller block is increased without increasing the thickness and bulk of the block and the receding formation of the periphery results in additional vibration of the particles of substance in the vicinity of the block as is indicated by the arrows in Fig. 6.

The vibration produced by the polygonal formation of the block 12 or 12' causes the disposition of the particles of substance around the block when the block is run at full speed to follow a circular line while the actual movement of the particles is in a sinuous broken line as they are thrown out by the angles of the polygon and then come in as allowed by the flat sides of the polygon. Such vibration is very minutely divided in and in this respect is far different from that produced by positive agitation by blades or paddles rotated at a high speed in the substance and in the case of milk elements the results are very much different and are in conformity with the requirements for producing true ebullition as hereinbefore described. Like the results produced by the centrifugal action and the steady rolling inflow in the upper part of the liquid resulting from this centrifugal action in the upper part since the action of the slightly projecting angles of the polygon is without material impact as would be the case with blades or paddles or other relatively widely extended impact means.

For separating butter from either sweet or sour cream, the liquid is placed in the vessel to about the height of the heavy dotted line, with the impeller about midway of the depth of the liquid as shown. It is important that the depth of the liquid above the impeller disk be not too great; otherwise the entrance of the air under atmospheric pressure will be hindered. It is also important that the distance between the impeller and the bottom of the vessel be not too great, because any considerable quantity of liquid too far below the impeller will not be affected by the aeration and other forces acting upon it, and will not have the butter separated from it, but will merely serve as a collecting place for the butter separated from the upper liquid. On the other hand it is highly desirable that the impeller disk be of considerable diameter in order to obtain the greatest amount of centrifugal action without impact and to operate on as large a quantity of liquid as is desired. For this reason the proper disposition of the body of liquid will be such that its width is considerably greater than its depth, as illustrated in the drawing, and it is for this reason that the vessel is made wide and low so that it is possible for all the forces applied to the liquid to act upon it in a uniform manner.

I claim:—

1. In a device of the class described and in combination with a containing vessel, the diameter of which is greater than its depth, a thin solid horizontally arranged rotating impeller having varying diameters the periphery of which moves in close proximity with the side wall of said vessel, said impeller having smooth upper and lower surfaces and the same being located adjacent the bottom of said vessel and designed to operate in a comparatively shallow body of liquid contained in said vessel, a vertically arranged shaft whereby said impeller is supported and driven, and means for rotating said shaft, substantially as described.

2. In a device of the class described and in combination with a containing vessel of relatively large diameter, a thin solid horizontally arranged rotating impeller the periphery of which moves in close proximity with the side wall of said vessel, said impeller having smooth upper and lower surfaces, and the same being located adjacent the bottom of said vessel and designed to operate in a comparatively shallow body of liquid contained in said vessel, and the periphery of which impeller is provided with a groove, a vertically arranged shaft whereby said impeller is supported and driven, and means for rotating said shaft, substantially as described.

3. In a device of the class described and in combination with a containing vessel of relatively large diameter, a thin solid horizontally arranged rotating impeller polygonal in form and the periphery of which moves in close proximity with the side wall of said vessel, said impeller having smooth upper and lower surfaces and the same being located adjacent the bottom of said vessel and designed to operate in a comparatively shallow body of liquid contained in said vessel, a vertically arranged shaft whereby said impeller is supported and driven, and means for rotating said shaft, substantially as described.

4. In a device of the class described and in combination with a containing vessel the diameter of which is greater than its depth, a thin solid horizontally arranged rotating impeller polygonal in form and the periphery of which moves in close proximity with the side wall of said vessel, said impeller having smooth upper and lower surfaces and the same being located adjacent the bottom of said vessel and designed to operate in a comparatively shallow body of liquid contained in said vessel and the periphery of which impeller is provided with a groove, a vertically arranged shaft whereby said impeller is supported and driven, and means for rotating said shaft, substantially as described.

5. In a device of the class described and in combination with a containing vessel the diameter of which is greater than its depth, a solid horizontally arranged rotating impeller of diameter greater than the depth of the vessel the periphery of which moves in close proximity with the side wall of said vessel, said impeller having smooth upper and lower surfaces and the same being located adjacent the bottom of said vessel and designed to operate in a comparatively shallow body of liquid contained in said vessel, a vertically arranged shaft whereby said impeller is supported and driven, and menas for rotating said shaft, substantially as described.

6. In a device of the character described, in combination with a vessel, an impeller adapted to be rotated while submerged in said substance in said vessel, a shaft on which said impeller is mounted for rotation, said shaft extending through said impeller and having an opening in it adjacent to where it extends through said impeller, a pin passing transversely through said opening, retaining and guiding means on said impeller at opposite sides of the shaft and alined with said pin and receiving said pin, and a stop for said pin mounted on said impeller, whereby one end of said pin engages with said stop, and movement of the pin out of said retaining and guiding means is limited when said pin is withdrawn from the opening in the shaft.

7. In a device of the character described, in combination with a vessel, an impeller, a shaft on which the impeller is mounted, and driving means for said shaft, a fly wheel mounted on said shaft with radial grooves on one side at opposite sides of the shaft, said shaft having a transverse opening in alinement with said grooves, and a pin passing through said opening and extending from the shaft into said grooves at each side and having a recess with ends that engage the sides of the shaft adjacent to the opening in the shaft to prevent endwise withdrawing of the pin from the shaft when held down by the fly wheel, said pin by engagement in said grooves causing rotation of the fly wheel with the shaft.

ALPHEUS FAY.

Witnesses:
CARL E. JOHNSON,
H. D. JOHNSON.

Copies of this patent may be obtained for five cents each, by addressing the "Commissioner of Patents Washington, D. C."